(12) United States Patent
Mori

(10) Patent No.: US 8,089,661 B2
(45) Date of Patent: Jan. 3, 2012

(54) EMBEDDING AUTHENTICATION INFORMATION TO PREVENT DOCUMENT SPOOFING

(75) Inventor: Ryuta Mori, Kawasaki (JP)

(73) Assignee: Canon Kabushiki Kaisha (JP)

( * ) Notice: Subject to any disclaimer, the term of this patent is extended or adjusted under 35 U.S.C. 154(b) by 494 days.

(21) Appl. No.: 12/142,022

(22) Filed: Jun. 19, 2008

(65) Prior Publication Data

US 2008/0316539 A1 Dec. 25, 2008

(30) Foreign Application Priority Data

Jun. 22, 2007 (JP) ................................. 2007-165307

(51) Int. Cl.
*H04N 1/40* (2006.01)
*G06K 9/00* (2006.01)

(52) U.S. Cl. .......... 358/3.28; 358/1.9; 358/2.1; 358/3.3; 358/3.31; 358/3.32; 358/2.99; 358/3.01; 358/3.02; 358/1.15; 358/1.14; 358/1.12; 358/1.16; 358/1.18; 358/501; 358/515; 358/529; 358/426.06; 382/100; 382/232; 382/135; 382/137; 382/171; 382/172; 382/173; 382/174; 382/175; 382/195; 382/148; 382/250; 382/274; 382/284; 380/22; 380/43; 380/51; 380/54; 380/201; 380/223; 380/226; 380/228; 380/229; 380/278; 713/155; 713/161; 713/168; 713/169; 713/170; 713/176; 713/193

(58) Field of Classification Search ................. 358/3.28, 358/1.9, 2.1, 3.3, 3.31, 3.32, 1.4, 1.8, 2.99, 358/3.01, 3.02, 1.12, 1.14, 1.16, 1.18, 501, 358/505, 515, 529, 426.06; 382/100, 232, 382/135, 137, 160, 165, 171–175, 195, 148, 382/250, 274, 284; 390/22, 43, 51, 54, 201, 390/223, 226, 228, 229, 250, 278; 713/155, 713/161, 168, 169, 170, 176, 193
See application file for complete search history.

(56) References Cited

U.S. PATENT DOCUMENTS 7,061,632 B1 * 6/2006 Livingston .................. 358/1.15
(Continued)

FOREIGN PATENT DOCUMENTS

JP 10-285378 A 10/1998
JP 2002-183093 A 6/2002
(Continued)

*Primary Examiner* — Steven Kau
(74) *Attorney, Agent, or Firm* — Rossi, Kimms & McDowell LLP

(57) ABSTRACT

In a computer system in which information represented by digital data is output to plural pages of recording medium, and then information on the plural pages of recording medium is read to use digital data representing the read information, authentication information is embedded in information of a start page selected by the computer system; a page number of the start page embedded the authentication information is notified to a user; information on the plural pages of recording medium is read, wherein the start page is positioned so as to be read first; digital data read from the plural pages of recording medium is authenticated based on the authentication information embedded in the start page; and a process for the digital data read from the plural pages of recording medium is controlled in accordance with a result of the authentication.

11 Claims, 15 Drawing Sheets

U.S. PATENT DOCUMENTS

| | | | |
|---|---|---|---|
| 7,770,013 B2 * | 8/2010 | Rhoads et al. | 713/176 |
| 7,826,101 B2 * | 11/2010 | Yano et al. | 358/403 |
| 2004/0083377 A1 * | 4/2004 | Wu et al. | 713/193 |
| 2005/0022108 A1 * | 1/2005 | Carro et al. | 715/500 |
| 2005/0059339 A1 | 3/2005 | Honda et al. | |

FOREIGN PATENT DOCUMENTS

| | | |
|---|---|---|
| JP | 2004-70466 A | 3/2004 |
| JP | 2004-171039 A | 6/2004 |
| JP | 2004-350085 A | 12/2004 |
| JP | 2006-352294 A | 12/2006 |
| JP | 2008-77238 A | 4/2008 |

* cited by examiner

START PAGE SETTING

- 701 — ☑ ACTIVATE START PAGE SETTING
- 702 — ☑ SMALL NUMBER OF PAGES SETTING  [ DETAILED ]

AUTHENTICATION INFORMATION FORM

- 703 — ● DIGITAL WATERMARK
- 704 — ○ BAR CODE
- 705 — ○ CLEAR TONER

INFORMATION LOCATION SETTING

| PRINT PAPER SURFACE (706) | INFORMATION LOCATION (707) |
|---|---|
| ● FRONT | ● IN FORM |
| ○ BACK | ○ OUT OF FORM |
| ○ RANDOM | ○ RANDOM |

[ OK ]  [ CANCEL ]

DETAILED SETTING

801 — NUMBER OF PAGES SETTING: [1] PAGE~ [2] PAGE

802 — NUMBER OF SCANS : [2] TIMES

803 — NUMBER OF ROTATIONS/REVERSIONS : [2] TIMES

804 — [✓] LOCATION INDICATION MARK SETTING

[ OK ]  [ CANCEL ]

SCAN RESTRICTION PROCESS

901 — SCAN ERROR LIMIT [2] TIMES

902 — OPERATIONS TO BE PERFORMED WHEN ERROR LIMIT IS EXCEEDED

902a — [✓] SCAN INTERRUPT

902b — [✓] ERROR MESSAGE

902c — [✓] NOTIFY ADMINISTRATOR

[ OK ]  [ CANCEL ]

| DOCUMENT TITLE | OUTPUTTED PAGE | START PAGE |
|---|---|---|
| PURCHASE AUTHORIZATION | 1 | ○ |
| | 2 | |
| | 3 | |
| | 4 | |

| DOCUMENT TITLE | OUTPUTTED PAGE | START PAGE | SUB START PAGE |
|---|---|---|---|
| PURCHASE AUTHORIZATION | 1 |  | ○ |
|  | 2 |  |  |
|  | 3 | ○ |  |
|  | 4 |  |  |

START PAGE SETTING

2001 — ☑ ACTIVATE START PAGE SETTING

2002 — NUMBER OF START PAGES    2003
○ SINGLE            ☑ PRIORITY
⦿ PLURAL              [ 3 ]

AUTHENTICATION INFORMATION FORM
2004 — ⦿ DIGITAL WATERMARK
2005 — ○ BAR CODE
2006 — ○ CLEAR TONER

INFORMATION LOCATION SETTING    2008
2007 — PRINT PAPER SURFACE   INFORMATION LOCATION
⦿ FRONT            ⦿ IN FORM
○ BACK             ○ OUT OF FORM
○ RANDOM           ○ RANDOM

[ OK ]  [ CANCEL ]

EMBEDDING AUTHENTICATION INFORMATION TO PREVENT DOCUMENT SPOOFING

BACKGROUND OF THE INVENTION

1. Field of the Invention

The present invention relates to an information processing method and a system thereof. Particularly, the present invention relates to a method of preventing spoofing for a document and a system thereof, which is intended to prevent spoofing of a user in a circumstance in which the document having once been output is again scanned and returned to a workflow.

2. Description of the Related Art

Conventionally, a technology such as an authentication by way of an IC card or a biometric authentication has been employed in order to implement a personal authentication when performing a scan of a document with such as a copying machine, as an example. Refer to Japanese Patent Application Laid-Open No. 2002-183093 for particulars.

With regard to a method of using a data that has been printed on paper, a technology has also been employed so as to connect to a server and use the data that has thus been printed as a key in order to acquire data from the server, and to replace the data thus obtained. Refer to Japanese Patent Application Laid-Open No. 10-285378 for particulars.

The conventional technology, however, allows an implementation of a spoofing attack with ease when the IC card is lost. Implementation of an authentication in order to prevent the spoofing attack also requires installing a new optional device, which incurs an excessive equipment cost.

SUMMARY OF THE INVENTION

The present invention prevents with ease the spoofing attack by running a robust check of an output management of an output document and an input document using a function of an output device such as a copying machine, without requiring new additional installation of either a biometric authentication device or other device for authentication thereto.

As an aspect of a computer system of the present invention, there is provided a computer system in which information represented by digital data is output to plural pages of recording medium, and then information on the plural pages of recording medium is read to use digital data representing the read information, the computer system comprising: an embedding unit adapted to embed authentication information in the information to be output of at least one page selected by the computer system when outputting information to the plural pages of recording medium; a notification unit adapted to notify a user of a page number of the selected at least one page embedded the authentication information by the embedding unit; a reading unit adapted to read information on the plural pages of recording medium, the selected at least one page being positioned as a start page to be read; an authentication unit adapted to authenticate digital data representing the information read from the plural pages of recording medium by the reading unit based on the authentication information embedded in the selected at least one page; and a control unit adapted to control a process for the digital data representing the information read from the plural pages of recording medium in accordance with a result of the authentication by the authentication unit.

As another aspect of an information processing method of the present invention, there is provided an information processing method in a computer system in which information represented by digital data is output to plural pages of recording medium, and then information on the plural pages of recording medium is read to use digital data representing the read information, the method comprising the steps of: embedding authentication information in the information to be output of at least one page selected by the computer system when outputting information to the plural pages of recording medium; notifying a user of a page number of the selected at least one page embedded the authentication information in the embedding step; reading information on the plural pages of recording medium, the selected at least one page being positioned as a start page to be read; authenticating digital data representing the information read from the plural pages of recording medium in the reading step based on the authentication information embedded in the selected at least one page; and controlling a process for the digital data representing the information read from the plural pages of recording medium in accordance with a result of the authentication in the authentication step.

As further another aspect of an information processing apparatus of the present invention, there is provided an information processing apparatus for registering and managing digital data in a computer system in which information represented by digital data is output to plural pages of recording medium, and then information on the plural pages of recording medium is read to use digital data representing the read information, the information processing apparatus comprising: a reception unit adapted to receive a request of outputting the registered digital data to the plural pages of recording medium; a selection unit adapted to select at random at least one page from the plural pages of recording medium to be output the registered digital data; an embedding unit adapted to embed authentication information in the information to be output of the at least one page selected by the selection unit; a transmitting unit adapted to transmit the registered digital data including the authentication information in the selected at least one page to output information representing the registered digital data to the plural pages of recording medium; a notification unit adapted to notify a user of a page number of the selected at least one page embedded the authentication information by the embedding unit; and a control unit adapted to control a process for digital data read from the plural pages of recording medium in accordance with a result of the authentication based on the authentication information embedded in the selected at least one page.

As still another aspect of an information processing apparatus of the present invention, there is provided an information processing apparatus for outputting information to plural pages of recording medium and reading information from the plural pages of recording medium in a computer system in which information represented by digital data is output to plural pages of recording medium, and then information on the plural pages of recording medium is read to use digital data representing the read information, the information processing apparatus comprising: a sending unit adapted to send a request of outputting registered digital data to plural pages of recording medium; a reception unit adapted to receive the registered digital data including authentication information in at least one page selected from the plural pages of recording medium; an output unit adapted to output the registered digital data including authentication information to the plural pages of recording medium; a reading unit adapted to read information on the plural pages of recording medium, the selected at least one page being positioned as a start page to be read; an authentication unit adapted to authenticate digital data representing the information read from the plural pages of recording medium by the reading unit based on the authentication information embedded in the selected at least one page; and a transmitting unit adapted to transmit the digital data read by the reading unit and a result of the authentication by the authentication unit.

As still further aspect of a computer system of the present invention, there is provided a computer system in which information represented by digital data is output to plural pages of recording medium, and then information on the plural pages of recording medium is read, comprising: a setting unit adapted to set start page information in the digital data; a notification unit adapted to notify the start page information set by the setting unit; an output unit adapted to embed the start page information in at least one of the plural pages of recording medium, and output the plural pages of recording medium including the at least one embedded page of recording medium; a reading unit adapted to read information on a page of recording medium which is indicated as start page based on the start page information notified by the notification unit; and a control unit adapted to perform authentication of the digital data by analyzing start page information on the page indicated as start page read by the reading unit, and control a reading process for the plural pages of recording medium in accordance with a result of the authentication.

According to the present invention, it is possible to implement a verification of a user by an authenticator as well as a check of an output management of an output document and an input document, between a digital workflow and a workflow that would be difficult to digitize. It is thereby possible to prevent, with ease, a spoofing attack by using a function of an output device such as a copying machine, without requiring a new additional installation of either a biometric authentication device or other device for authentication thereto.

Further features of the present invention will become apparent from the following description of exemplary embodiments, with reference to the attached drawings.

BRIEF DESCRIPTION OF THE DRAWINGS

FIG. 7 depicts an example of a user interface for setting a start page according to the first embodiment.

FIG. 8 depicts an example of a user interface for setting a small number of pages according to the embodiment.

FIG. 9 depicts an example of a user interface for setting a scan restriction process according to the embodiment.

FIG. 19 depicts an example of a start page information table according to the second embodiment.

FIG. 20 depicts an example of a user interface for setting a start page according to the second embodiment.

DESCRIPTION OF THE EMBODIMENTS

An embodiment of the present invention will be described below with reference to the accompanying drawings.

Example of Configuration of Computer System According to Embodiment

Figure 1:
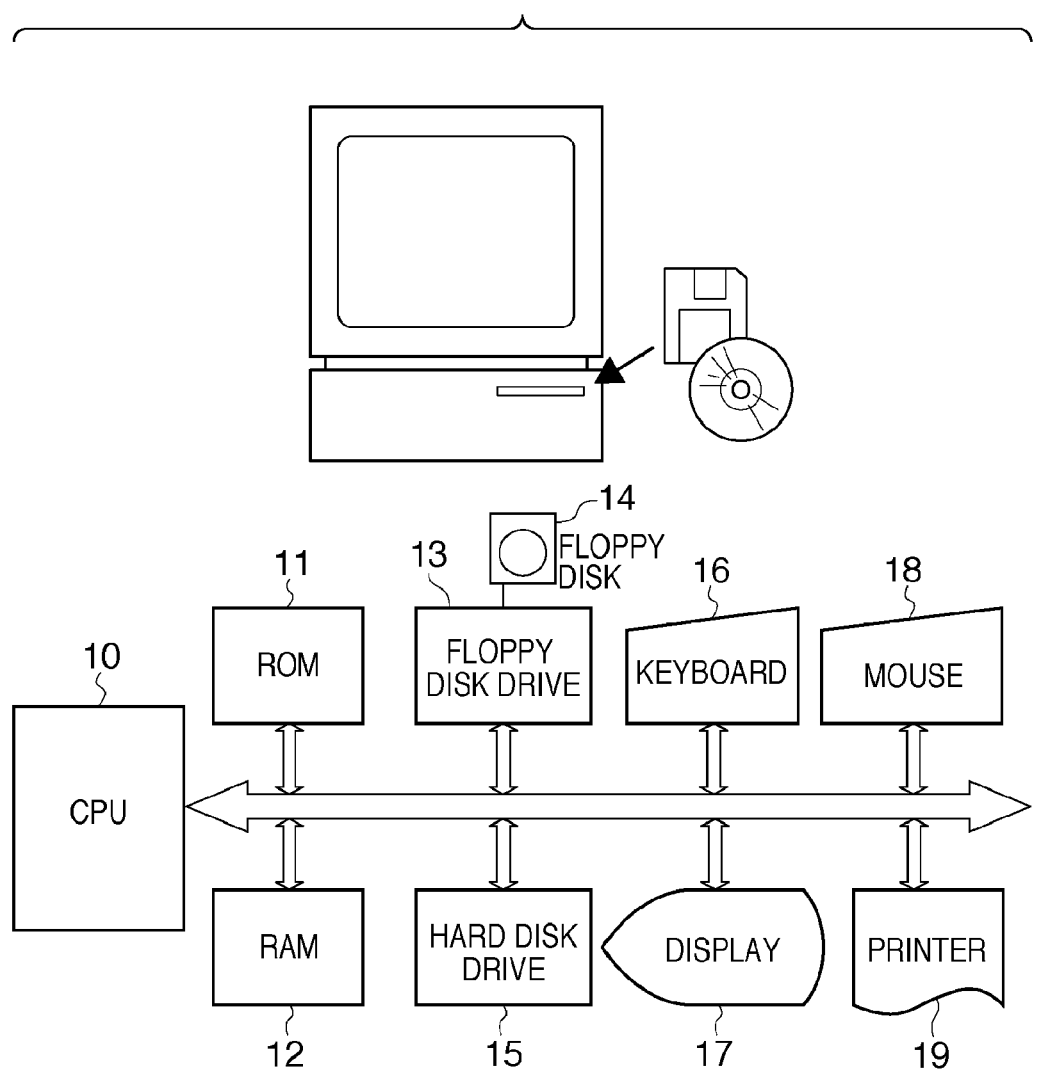
FIG. 1 is a block diagram that depicts an example of a configuration of a computer according to an embodiment.

FIG. 1 depicts an example of a configuration of a computer that configures a computer system according to an embodiment.

The computer system is a system in which a plurality of computers bi-directionally connect each other by way of a network bus. The computer includes a CPU 1—as a central processing unit. The computer also includes a ROM 11 and a RAM 12 as a primary storage unit, and for example, a floppy disk drive 13 which controls a reading and a writing of a floppy disk 14, or a hard disk drive 15 as an external storage unit. The computer also includes for example, a keyboard 16 and a pointing device such as a mouse 18 as an input unit, and a display device such as a CRT display 17 and a print device such as a printer 19 and a plotter as an output device. Those configuration elements are also connected by way of a system bus 20.

The computer operates by way of the CPU 10 executing a basic I/O program, an operating system (OS), and control programs. The basic I/O program is written in the ROM 11, and the operating system is written in the hard disk drive 15. When a power supply of the computer is switched on, the operating system is read out from the hard disk drive 15 into the RAM 12, by way of an initial program loading (IPL) function that is included within the basic I/O program, and an operation of the operating system is initiated. The computer programs are made into sequences of program codes in accordance with flowcharts of control sequences that are depicted by such as the attached drawings.

Example of Configuration of Storage According to the Embodiment

Figure 2:
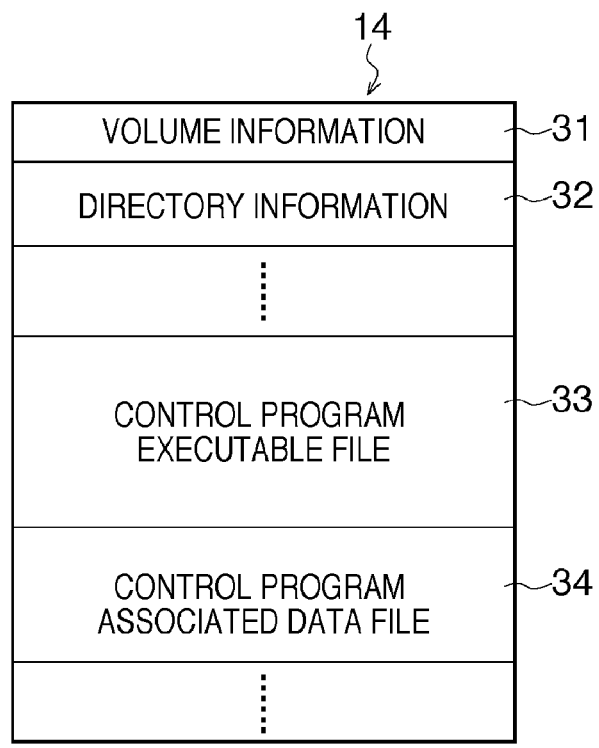
FIG. 2 depicts an example of contents that are recorded in a storage unit according to the embodiment.

In a circumstance according to the embodiment, the computer programs and associated data are recorded on the floppy disk 14, and a configuration of contents that are recorded thereon is depicted in FIG. 2.

It is possible to load the computer programs and the associated data that are recorded on the floppy disk 14 into the computer via the floppy disk drive 13, as depicted in FIG. 1. Placing the floppy disk 14 in the floppy disk drive 13 allows the computer programs and the associated data to be read out from the floppy disk 14, loaded in the RAM 12, and processed, under a control of the operating system and the basic I/O program.

A volume information 31, which includes information such as information for identifying the floppy disk 14 and a capacity thereof, is stored in a header of the floppy disk 14. Next, a directory 32, which stores, for example, a storage location within the floppy disk 14 and a file name, is stored on the floppy disk 14. An executable file 33 of the control program used in the embodiment and an associated data file 34 for use by the control program are stored within a data storage area.

Figure 3:
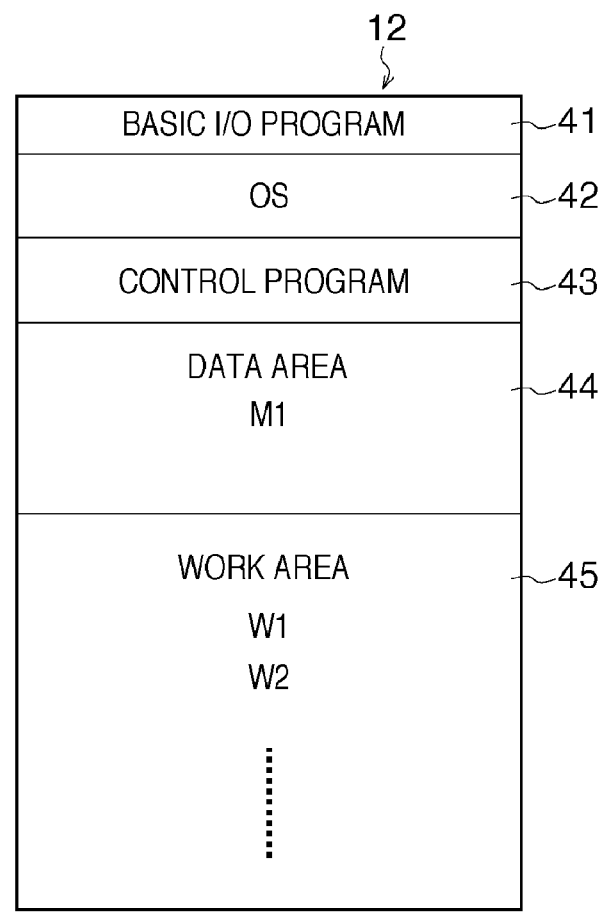
FIG. 3 depicts an example of a configuration in a memory in a state in which a control program is loaded into a RAM and is executable, according to the embodiment.

FIG. 3 depicts a memory map in a state in witch the control program is loaded into the RAM 12 and is executable.

In FIG. 3, a basic I/O program 41 and an operating system 42 are loaded into the RAM 12. A particular control program 43 according to the embodiment is loaded into the Ram 12. The data used according to the embodiment is stored in a data area (M1) 44. Work areas (W1, W2, . . . ) 45 are used as temporary storage areas when the CPU 10 executes the control program 43.

According to the embodiment, an example is depicted of directly loading the computer program and the associated data into the RAM 12, and executing the computer program and the associated data. It would be permissible, however, to initially install the computer program and the associated data from the floppy disk 14 into the hard drive 15, and then to load the computer program and the associated data from the hard drive 15 into the RAM 12 at a stage of running the program, instead. It would also be permissible for a medium recording the computer program such as a CD-ROM or an IC memory card, instead of a floppy disk. It would furthermore be possible to record the program in the ROM 11, which is configured to be served as a portion of the memory map, and to execute the program thus recorded and configured in the ROM 11 directly with the CPU 10.

Example of Configuration of Network System According to the Embodiment

Figure 4:
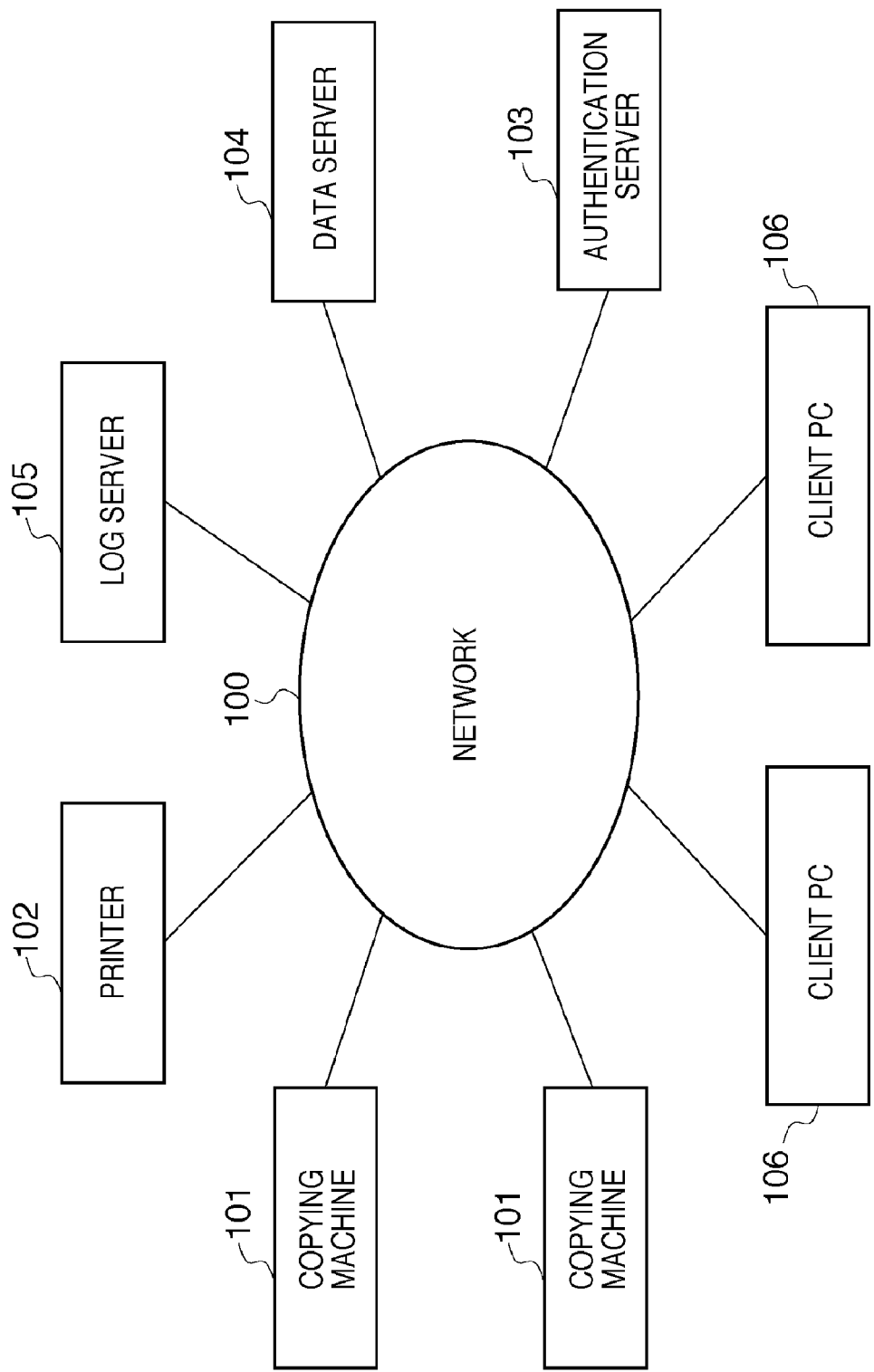
FIG. 4 depicts an example of a configuration of a network system according to the embodiment.

FIG. 4 depicts an example of a configuration of a network system in which a plurality of the computers are connected, according to the embodiment.

With regard to the network system according to the embodiment, copying machines 101 and a printer 102, for performing a personal authentication as well as an input and/or an output of data, are connected to a network 100. Also connected to the network 100 is an authentication server 103 in which an authentication information is accumulated, a data server 104 in which various types of data file are stored, and a log server 105 which manages a history of operations such as an inputting, outputting or a change of a document. Also connected to the network 100 are client personal computers (PCs) 106, for receiving page information from the respective servers.

Example of Process with Respect to System According to the Embodiment

Example of Workflow According to the Embodiment

Figure 5:
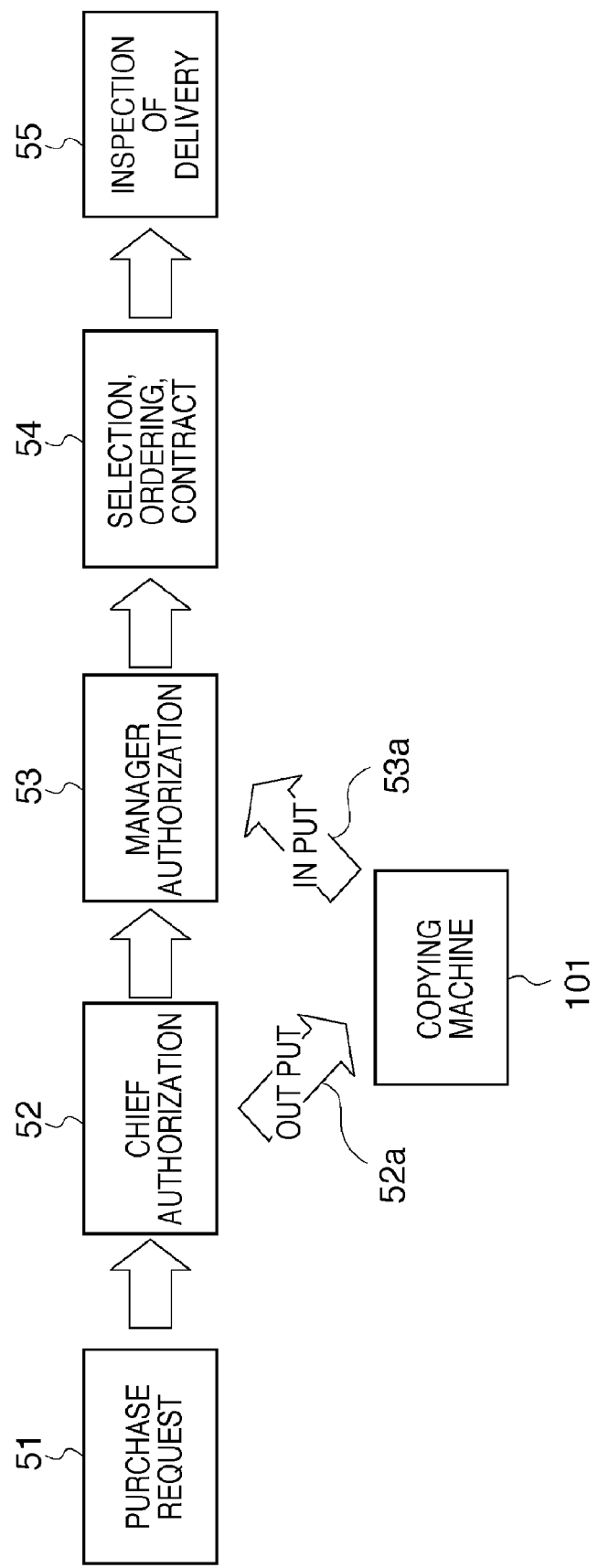
FIG. 5 depicts an example of a workflow as imaged according to the embodiment.

FIG. 5 depicts a workflow that is assumed according to the embodiment.

In FIG. 5, the workflow progresses in a sequence of a purchase request 51→a chief authorization 52→a manager authorization 53→a selection, ordering and contract 54→an inspection of delivery 55. Electronic data also follows the workflow.

According to the embodiment, the workflow is assumed to include its part which cannot be digitized. That is, a circumstance is assumed in FIG. 5 in which, between the chief authorization 52 and the manager authorization 53, the document is output to the copying machine 101 as a hardcopy document (52a), and the hardcopy document is modified by a user, and then the modified document is scanned and placed in the digital workflow once more (53a).

First Embodiment

Overview of Process According to First Embodiment

Figure 6:
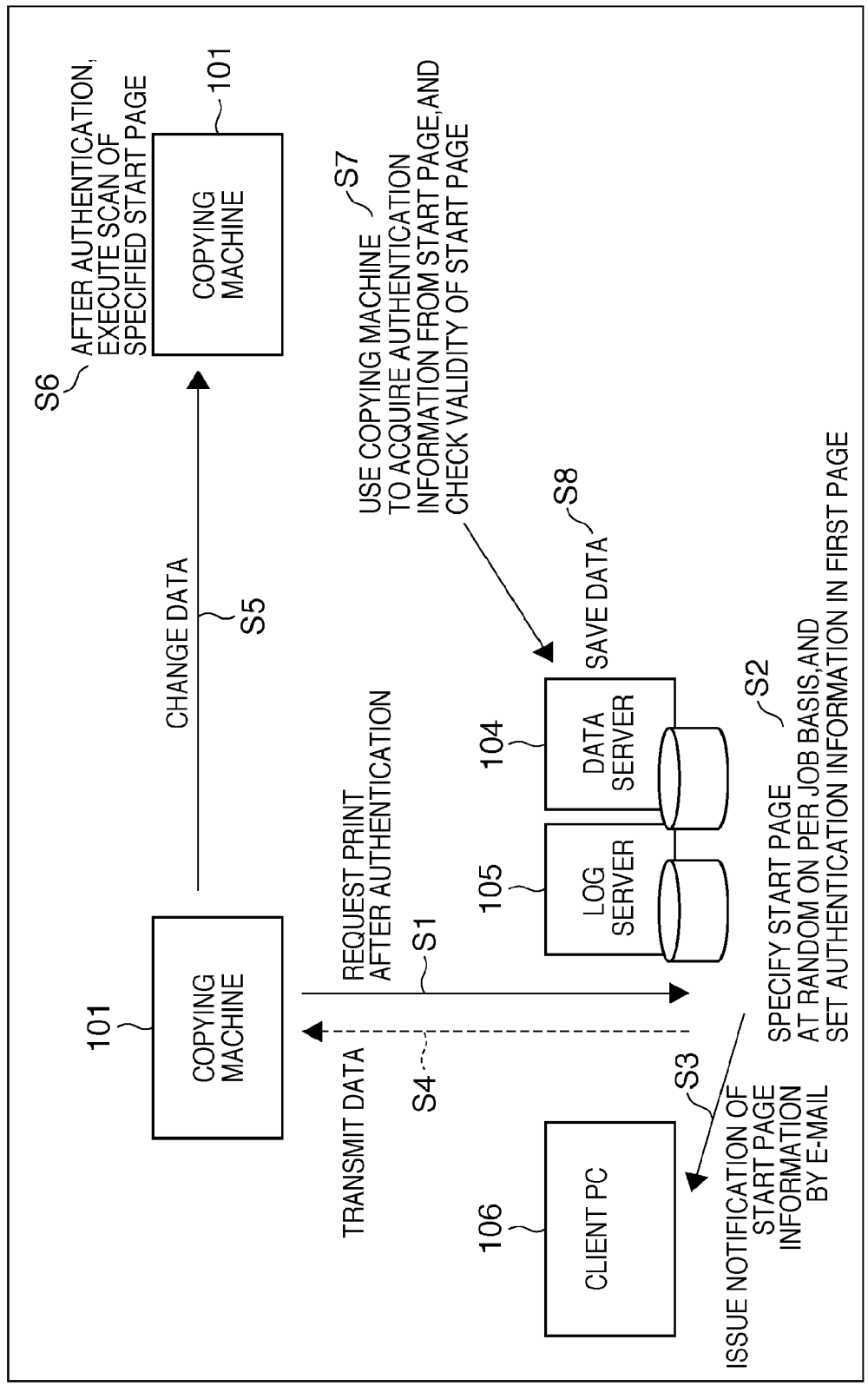
FIG. 6 depicts an overview of an example of a process according to a first embodiment.

FIG. 6 depicts an overview of an information processing method according to the first embodiment.

The copying machine 101 first executes an authentication process when outputting the document from the digitized workflow. As a result thereof, a list of documents that are under management of a user is displayed on the copying machine 101. In step S1, the user selects a document to be output from the copying machine 101, and requests a printout of the selected document. In step S2, a start page is specified at random from among a plurality of pages in the selected document on a per print request or a job basis in the data server 104 or the log server 105, and an authentication information is set in the first page. In step S3, start page information including a page number of the start page is transmitted to the user's client PC 106 by e-mail.

In step S4, the print data is transmitted to the copying machine 101, and output from the copying machine 101. In step S5, the user performs some change operations such as an addition or a modification to the output document.

After finishing the change of the output document, in step S6, if the user is authenticated in the copying machine 101, the user positions the page specified as the start page at a head of the document to be scanned, and executes a scan by the copying machine 101. In step S7, the copying machine 101 checks a validity of the start page in the scanned document based on the authentication information in the start page scanned in step S6. In step S8, if a result of the check is valid, the data of the scanned document is saved temporarily, and after the user has been performed a verification of the data, the data and the log is registered in the data server 104 and the log server 105 respectively.

Example of Display Screen According to the Embodiment

FIG. 7 depicts an example of a user interface (UI) 700 of the client PC 106 for setting the start page according to the embodiment.

Using the user interface for setting the start page allows setting whether or not to use the function of the present invention on a per document basis. Checking a checkbox of "activate start page setting 701" activates the function of the present invention to the document to be output. Checking a checkbox of "small number of pages setting 702" activates a small number of pages setting to the document to be output.

Authentication information in the start page is created using Hash function from a number of the start page, a user name creating the document, a document name, a document creation time and so on. Digital data digitized using the Hash function is embedded in the document in a form of watermark, bar code, clear toner and so on. However, any other methods than the Hash function may be used as long as creating unique identifying information.

Next, it becomes possible to set three settings as output forms on a paper of the authentication information in the start page for specifying a paper and storing the information indicating the start page. When a button of digital watermark 703 is set, the authentication information is printed on the first page as watermark information. When a button of bar code 704 is selected, the authentication information is converted to a bar code and output the bar code on the first page. When a button of clear toner 705 is selected, the authentication information is printed on the start page with a transparent toner which cannot be visually recognized.

Next, an indication is made as to which location of the start page to output the authentication information on the paper. Selecting a print paper surface 706 and a information location 707, respectively, causes the authentication information to be output in the selected location of the start page.

FIG. 8 is a detailed setting user interface (UI) 800 for setting the small number of pages in detail, which is activated when setting the checkbox of "small number of pages setting 702" in FIG. 7. In the present circumstance, checking the checkbox of small number of pages setting 702 and setting pages in "number of pages setting 801" in FIG. 8 causes an authentication of the output document to be performed by scanning a plurality of pages set in the number of pages setting 801. Using the plurality of pages to perform the authentication of the output document by checking the checkbox of the small number of pages setting 702 results in higher security than the security that would be achieved by performing the authentication of the output document using only the start page.

The "number of pages setting 801" sets a range of pages from the start page in the document to which the present function applies. A "number of scans setting 802" specifies an allowable number of scans for the first page. As an example, setting the number of scans setting 802 to two causes the authentication of the output document to be performed by scanning the start page twice. The authentication of the output document will not be performed even if the start page is scanned once. A "number of rotations/reversions 803" specifies a number of rotations or reversions for the start page. As an example, setting the number of rotations or reversions to two causes an authentication of the output document to be performed when the start page has been scanned twice, each performed in a designated direction with rotating the start page. The authentication of the output document is not performed unless the first page has been scanned in the designated directions. When a checkbox of "location indication mark setting 804" is checked, a marking is stamped on the print paper, which indicates a top, a bottom, a left hand, and a right hand side of a printed medium.

FIG. 9 depicts a user interface (UI) 900 for setting a scan restriction process from the client PC 106 according to the embodiment.

Performing a setting herein allows preventing unfair retry when scanning a document. A "scan error limit 901" is set to specify how many times a document may be rescanned when a scan fails. It would be possible to select operations, as "operations to be performed when the error limit is exceeded 902" when halting the authentication, such as a scan interrupt 902*a*, an error message output 902*b*, or a notification to an administrator 902*c*, and a operation(s) of an item selected therein is performed when an error occurs.

Example of Printing of Start Page According to the Embodiment

Figure 10:
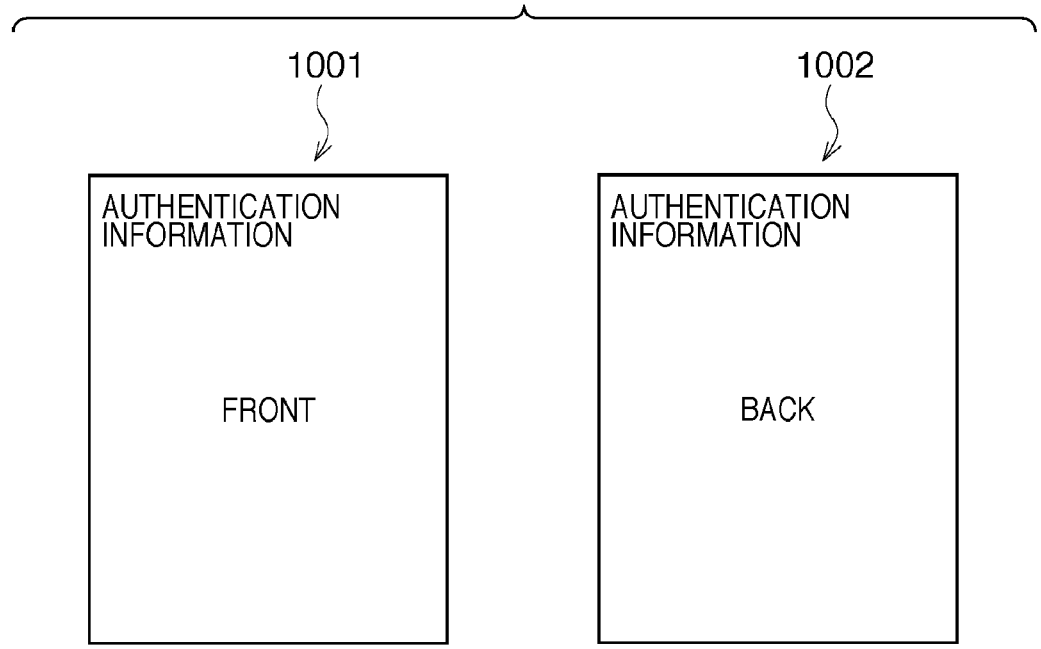
FIG. 10 depicts an example of appending authentication information according to the embodiment.

FIG. 10 is an image of stamping an authentication information on a document, which is printed and scanned with the copying machine 101 according to the embodiment. A location at which the authentication information is stamped, for example, whether to stamp the authentication information on a front surface 1001 or a back surface 1002 of the print paper, is changed in accordance with the designation in the start page setting.

Figure 11:
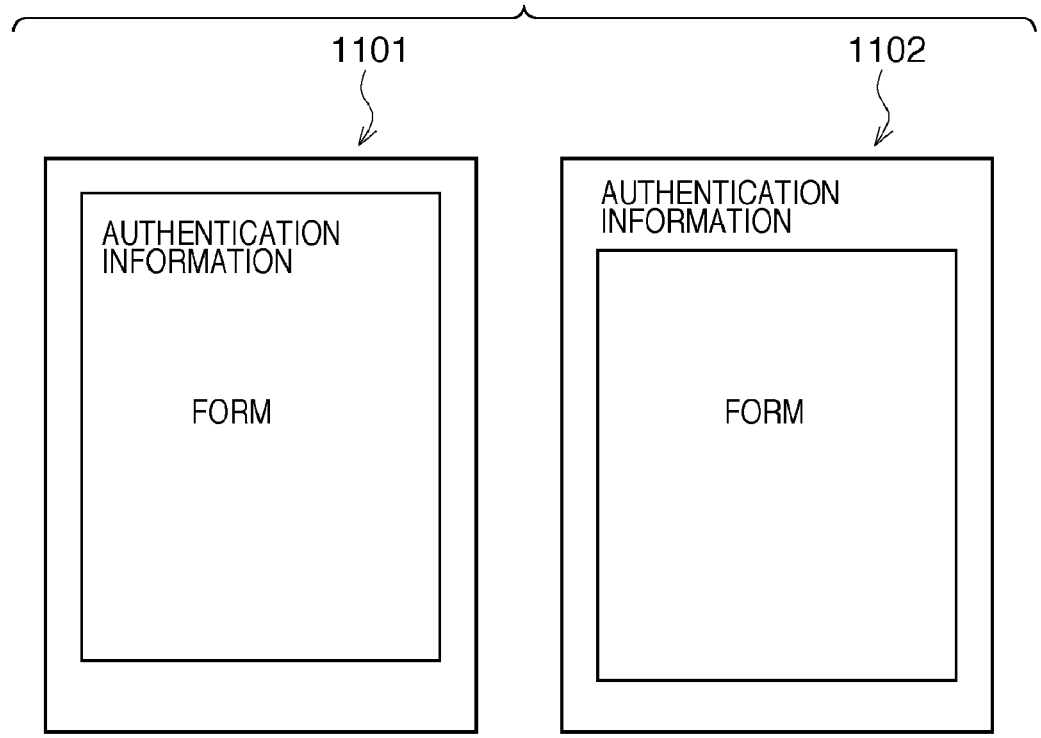
FIG. 11 depicts another example of appending authentication information according to the embodiment.

FIG. 11 is an image of stamping an authentication information on a document, which is printed and scanned with the copying machine 101 according to the embodiment. A location at which the authentication information is stamped, that is, whether to stamp the authentication information within a form 1101 or outside of a form 1102 on the print paper, is changed in accordance with the designation of the header page setting.

Example of Sequence of Printing of Start Page According to the Embodiment

Figure 12:
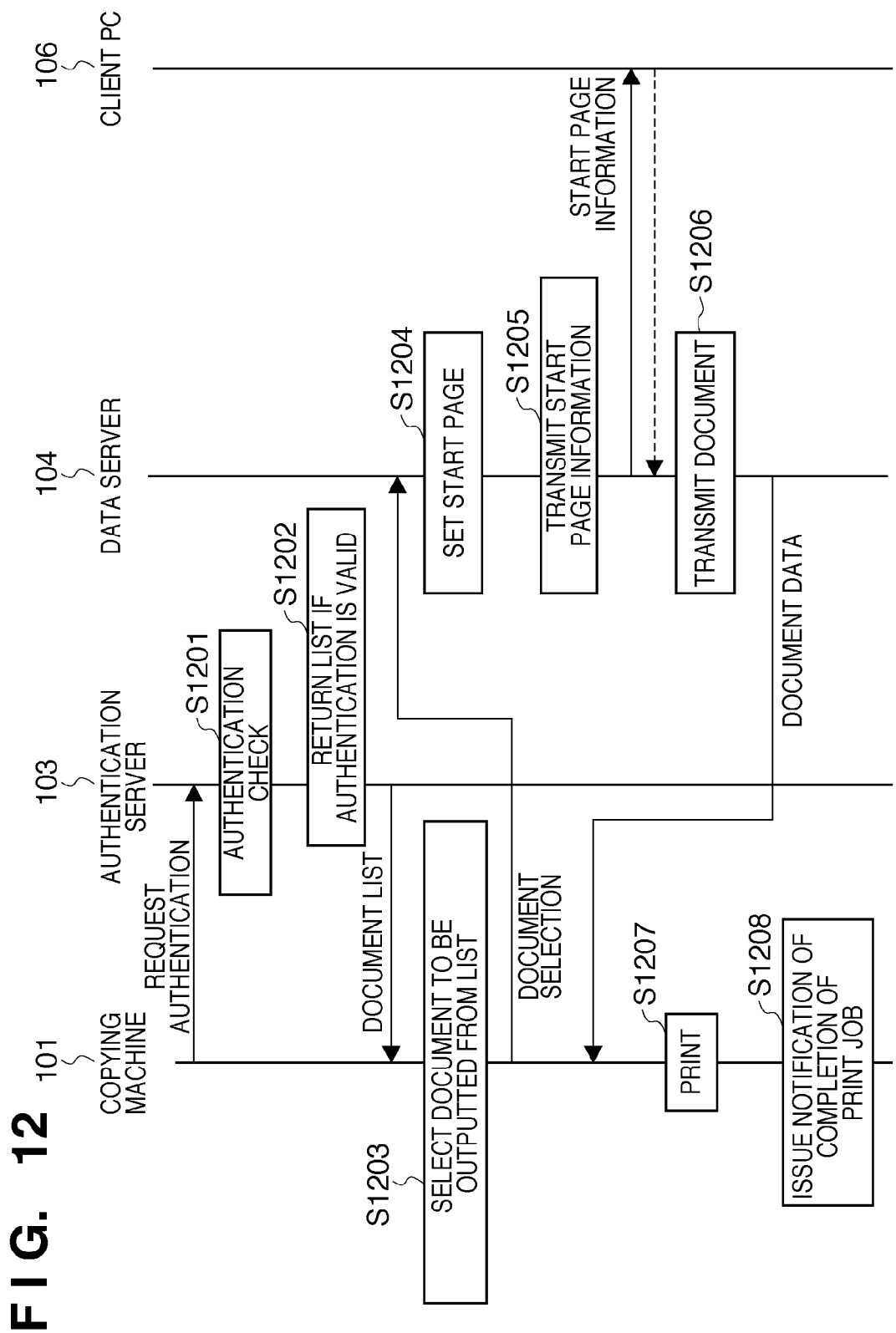
FIG. 12 depicts an example of a sequence when outputting data according to the embodiment.

FIG. 12 is a diagram of an overall system sequence when outputting the data of the start page according to the embodiment.

The process beings when the copying machine 101 sends a request for personal authentication to the authentication server 103. In step S1201, the authentication server 103 performs the personal authentication, and if the personal authentication is valid, the authentication server 103 returns a list of documents available to the authenticated user to the copying machine 101 in step S1202.

In step S1203, the user selects a document to be output from the received list. In step S1204, the data server 104 receives information of the selected document, and sets a start page for the selected document. In step S1205, the data server 104 transmits information of the set start page to the client PC 106. It is to be understood that it would also be permissible, in step S1205, to display the start page information on a user interface (not shown) of the data server 104. In step S1206, the data server 104 transmits actual data of the selected document to the copying machine 101. In step S1207, the copying machine 101 executes actual printing of the selected document, and in step S1208, issues a notification that the printing of the selected document has been completed.

The setting of the start page in step S1204 may be performed by a process in which the data server 104 specifies an arbitrary page in the document as start page in random or a user designates a page number of the start page. The set page number of the start page is stored in associated with the document in the data server 104.

Example of Sequence of Reading a Start Page According to the Embodiment

Figure 13:
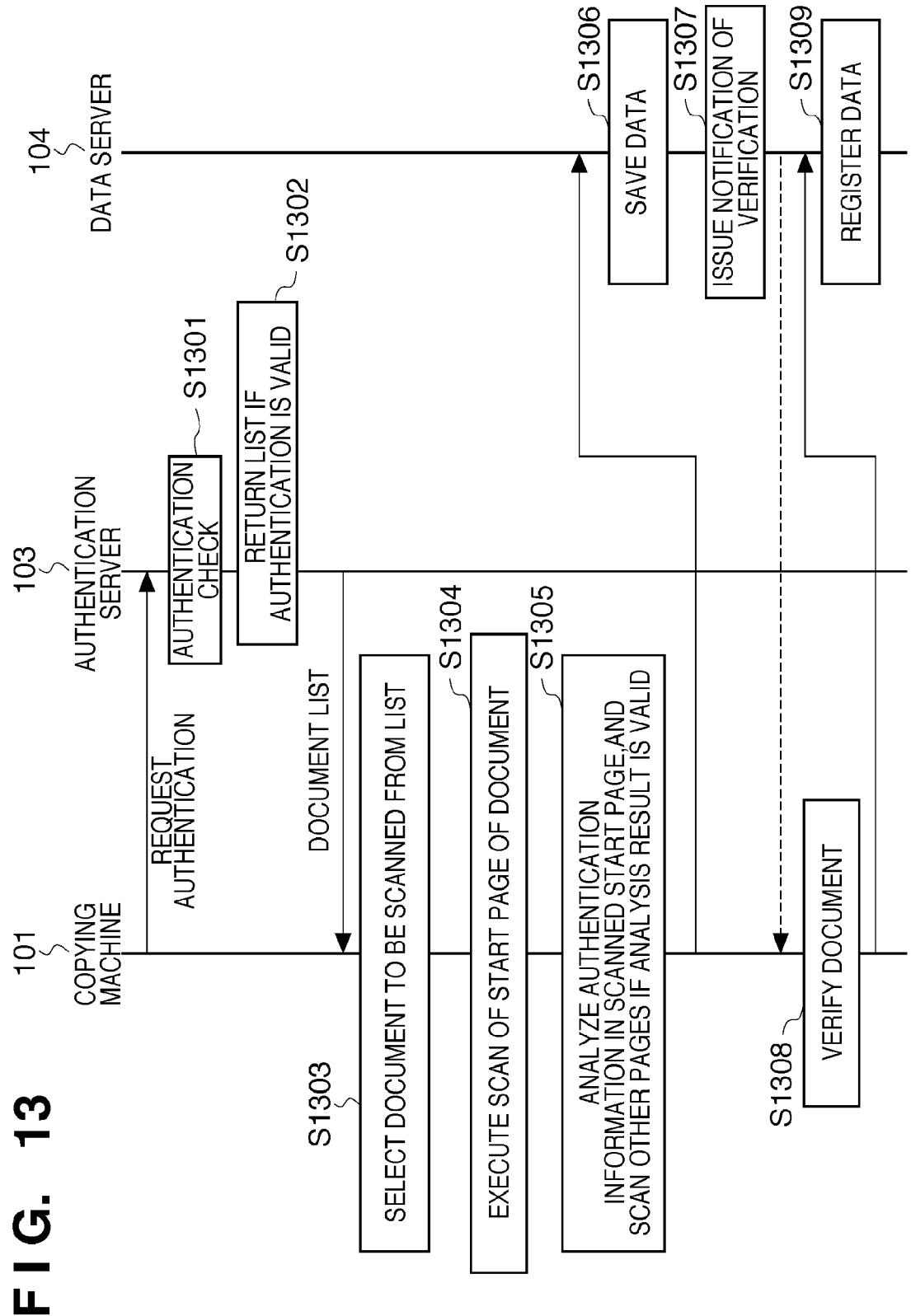
FIG. 13 depicts an example of a sequence when inputting data according to the embodiment.

FIG. 13 is a diagram of an overall system sequence when inputting data of the start page according to the embodiment.

The sequence begins when the copying machine 101 sends a request for personal authentication to the authentication server 103. In step S1301, the authentication server 103 executes the personal authentication, and if the authentication is valid, the authentication server 103 returns a list of documents available to the authenticated user to the copying machine 101 in step S1302.

In step S1303, the user selects a document to be input from the received list. In step S1304, the copying machine 101 scans a start page of the document to be inputted, which is specified in accordance with the start page information transmitted by e-mail in step S1205 of FIG. 12. In step S1305, information of the scanned start page is analyzed by the copying machine 101, and if the analysis of the start page information is satisfactory, other pages of the document to be inputted are scanned by the copying machine 101 in step S1305.

The analysis of the start page information is performed by comparing the authentication information of the scanned start page with the start page information already stored in the data server 104. For example, if the page number in the authentication information of the scanned start page is equal to the page number of start page stored in the data server 104, the scanning of other pages of the document by the copying machine 101 starts in step S1305.

In step S1306, scanned data is temporarily saved in the data server 104. In steps S1307 and S1308, a verification by the user for the data to be registered is performed. If the successful verification is received, in step S1309, the scanned data of the document is actually registered in the data server 104.

Figure 14:
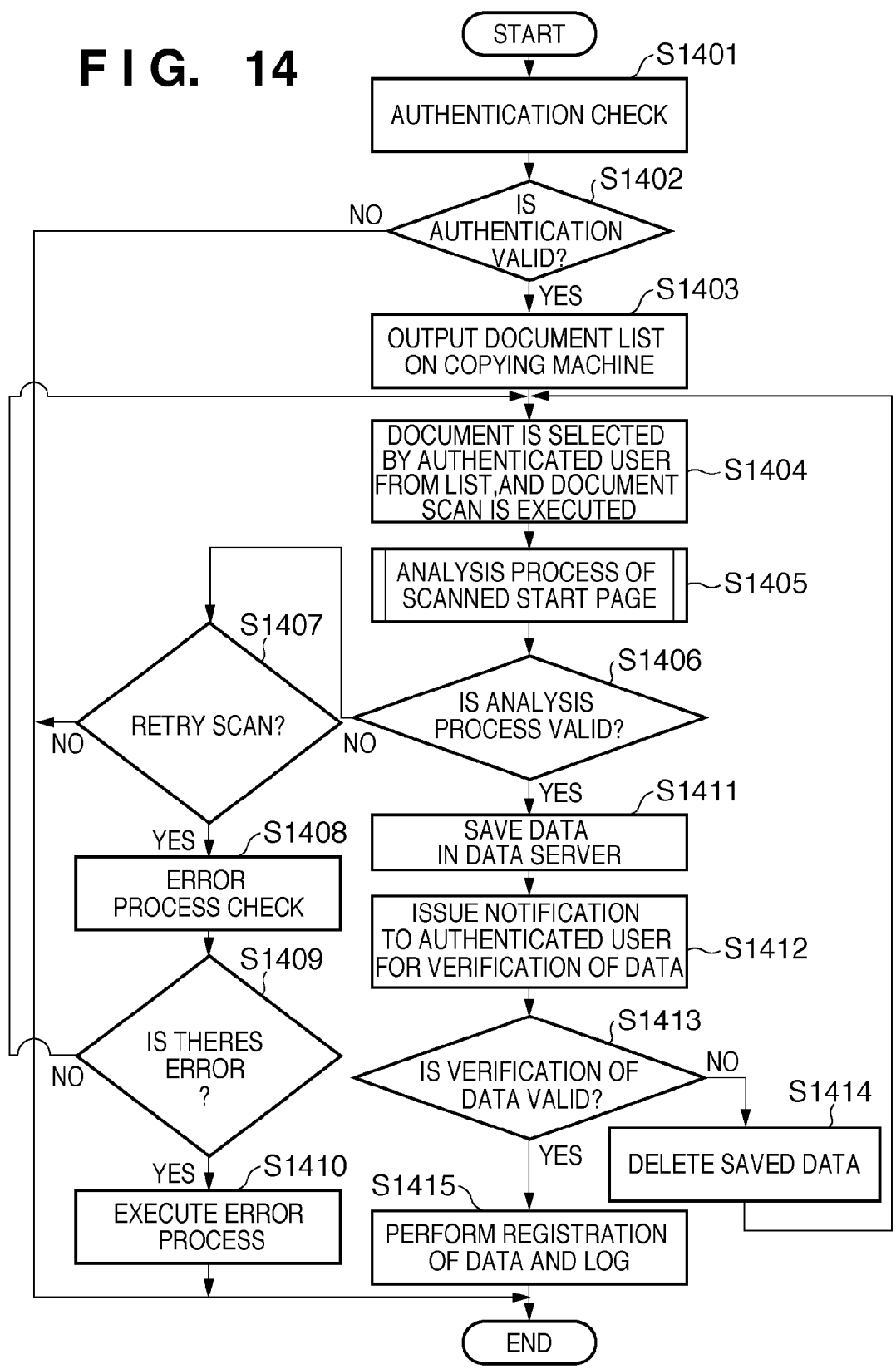
FIG. 14 is a flowchart that depicts an example of a process sequence when inputting the data according to the embodiment.

Example of Process Sequence of Reading Start Page According to the Embodiment FIG. 14 is a flowchart that depicts an example of a process sequence of the overall system when inputting the data of the start page according to the embodiment.

In step S1401, when the copying machine 101 sends a request for personal authentication to the authentication server 103, the authentication server 103 performs the personal authentication of a user. If a result of the personal authentication in step S1402 is "YES," in step S1403, the authentication server 103 returns a document list to the copying machine 101, and the returned document list is displayed at the copying machine 101. If the result of the personal authentication in step S1402 is "NO," the reading process terminates.

In step S1404, at the copying machine 101, a document to be input is selected from the document list by the authenticated user, and a scan of the selected document is executed. In step S1405, the copying machine 101 executes an analysis process of the scanned start page. A detailed description of the analysis process will be provided hereinafter with reference to FIG. 15.

In step S1406, the copying machine 101 determines whether or not the analysis process has been correctly performed. If a result of the determination in step S1406 is "NO," in step S1407, a selection is made as to whether or not to retry the scan. If the scan is to be retried, an error process of the copying machine is checked in step S1408. If there is no error, the process returns from step S1409 to step S1404 and the selection of a document is repeated. If there is an error, an error process is executed in step S1410.

If the analysis process in step S1405 is executed successfully, in step S1411, the copying machine 101 transmits the scanned data of the document to the data server 104, and temporarily stores the scanned data of the document in the data server 104. As mentioned above, process to be performed after the analysis process, that is, the authentication process, in step S1405 is controlled by the result of the analysis or authentication. In step S1412, the data server 104 notifies the copying machine 101 of a verification of the scanned data, and a verification of the scanned data is performed by the authenticated user at the copying machine 101. If the verification of the scanned data is not successful, that is, if a result of a check in step S1413 is "NO," in step S1414, the scanned data temporarily stored in the data server 104 is deleted. The process returns to step S1404 and begins with the selection of the document once more. If the verification of the scanned data succeeds, that is, if the result of the check in step S1413 is "YES," in step S1415, the scanned data is registered in the data server 104 and the log is registered in the log server 105.

Example of Sequence of Analysis Process Step S1405 in FIG. 14

Figure 15:
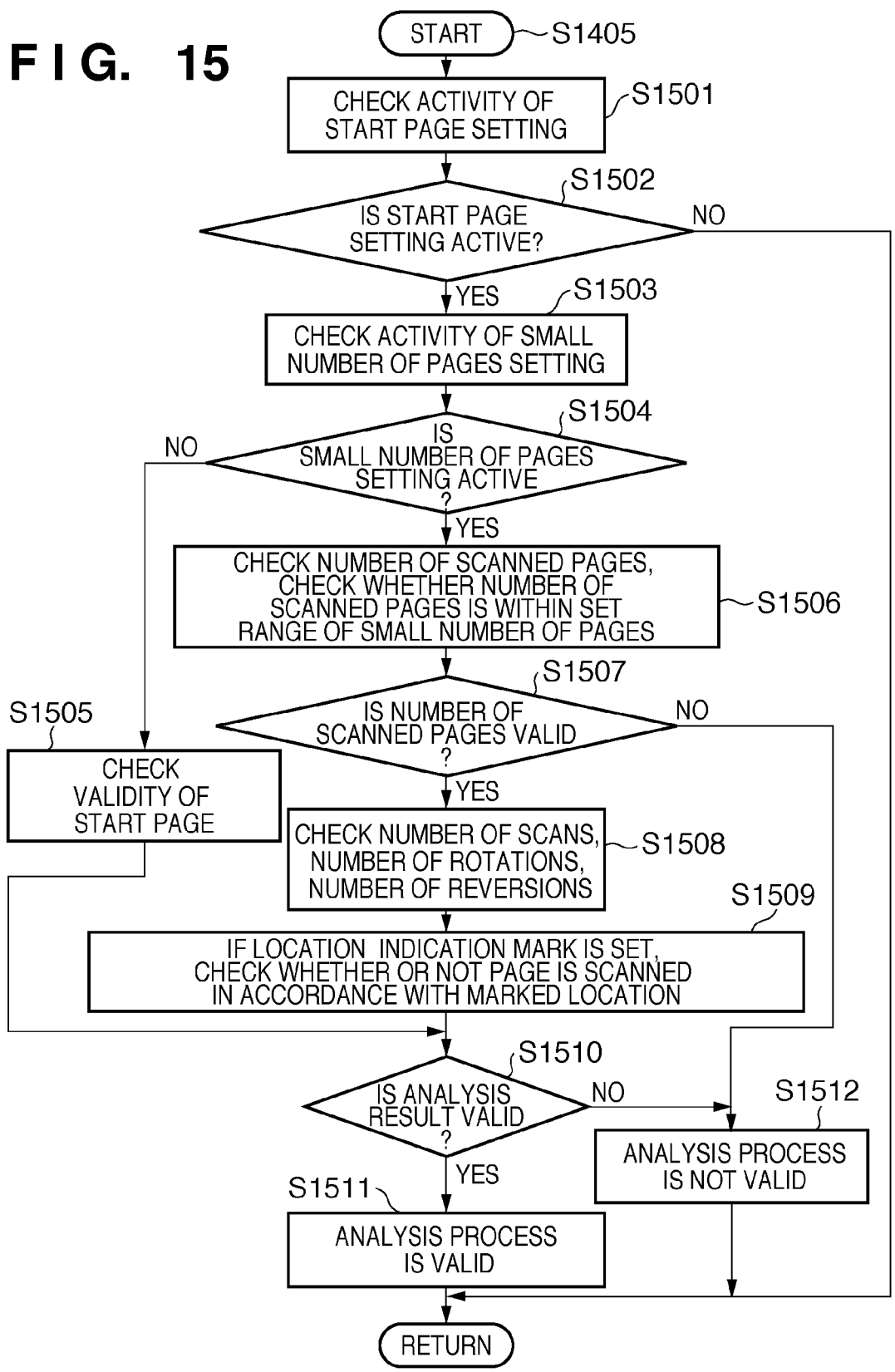
FIG. 15 is a flowchart that depicts an example of a detailed sequence of an analysis process (S1405) depicted in FIG. 14.

FIG. 15 is a flowchart that depicts an example of a process sequence of an analysis process of the step S1405 performed in the copying machine 101 when inputting the data in FIG. 14.

In step S1501, a activity of the start page setting is checked. If the start page setting is determined to be active, that is, step S1502 is "YES," in step S1503, a activity of a small number of pages setting is checked. If the start page setting is determined not to be active, that is, step S1502 is "NO," the analysis process terminates.

If the small number of pages setting is active, that is, step S1504 is "YES," in step S1506 it is checked whether or not a number of the scanned pages is within the set range of the small number of pages. If the small batch page setting is not active, that is, step S1504 is "NO," in step S1505, the validity of the start page, that is, whether or not the start page is proper, is checked.

If in the check of step S1506, a number of the scanned pages is within the set range of the small number of pages, that is, step S1507 is "YES," in step 1508, the number of scans and the number of rotations/reversions are checked. Specifically, they are checked whether the set number of scans has been performed, and whether the number of rotations/reversions has been performed. If the number of the scanned pages is not within the set range of the small number of pages, that is, step S1507 is NO, the analysis process is invalidated in step S1512 and terminates. If, after step S1508, the location indication mark is set, in step S1509, it is checked whether or not the page has been scanned in accordance with the marked location.

In step S1510, it is checked whether or not the analysis is valid, and if the analysis is valid, that is, step S1510 is "YES," the analysis process is validated in step S1511 and terminates. If the analysis is invalid, that is, step S1510 is "NO," the analysis process is invalidated in step S1512 and terminates.

Specific Example of Reading Start Page According to the Embodiment

Figures 16, 17:
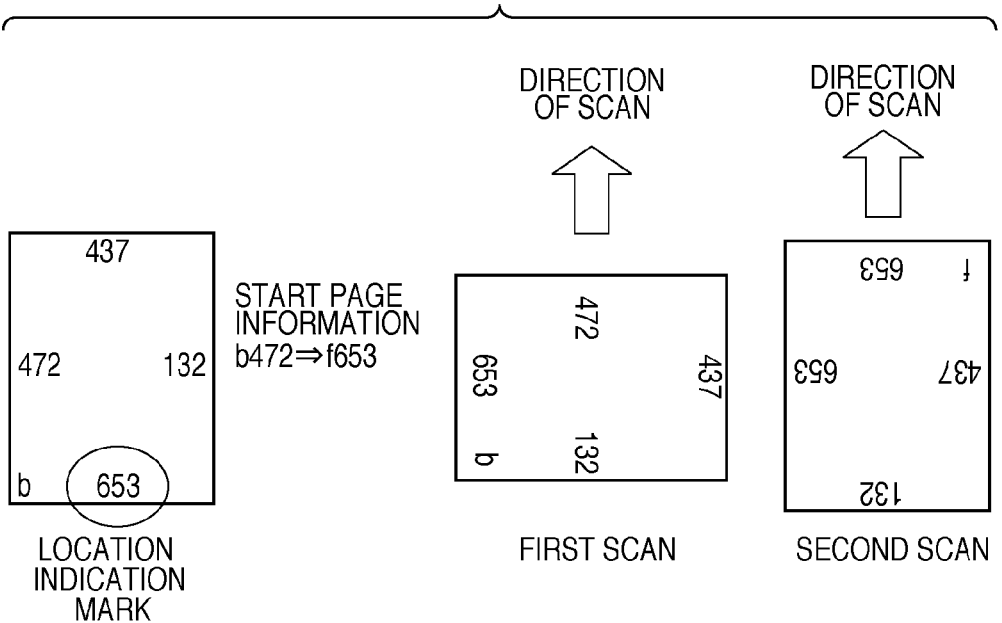
FIG. 16 depicts an example of imaging when performing a data scan according to the embodiment.
FIG. 17 depicts an example of a start page information table according to the embodiment.

FIG. 16 depicts an image of the scanning by the copying machine 101 when setting the small number of pages according to the embodiment.

If a "b472->f653" is determined and notified as the start page information, the scan of the start page is accomplished by performing a first scan in a direction of scanning from location 472 of a back surface of the start page, and by performing a second scan in a direction of scanning from location 653 of a front surface of the start page.

FIG. 17 is an example of a table 1700 of the start page information, which is generated in the data server 104 or the log server 105 according to the embodiment.

The table 1700 of the start page information stores output pages 1702 associated with a document name 1701 and a start page 1703 is selected from the stored output pages 1702.

The data of the table 1700 is generated on a per document basis by the data server 104 or the log server 105, when executing the print request from the copying machine 101. According to the present example, a third page is automatically selected as the start page by the data server 104 or the log server 105 for the print job of the purchase authorization document, and the information is registered as the table 1700 in the data server 104 or the log server 105.

Second Embodiment

According to a second embodiment, the present invention allows a user to designate a plurality of pages as the start pages, instead of fixing only a page as the start page.

According to the first embodiment, if a page specified as the start page is lost after the document has been output, it is not possible to restore the document to the work flow by rescanning the document. However, if a plurality of the start pages can be specified, it is possible to successfully carry out the analysis process and to restore the document to the work flow by scanning a sub start page, even if the page specified as the start page is lost.

Overview of Process According to the Second Embodiment

Figure 18:
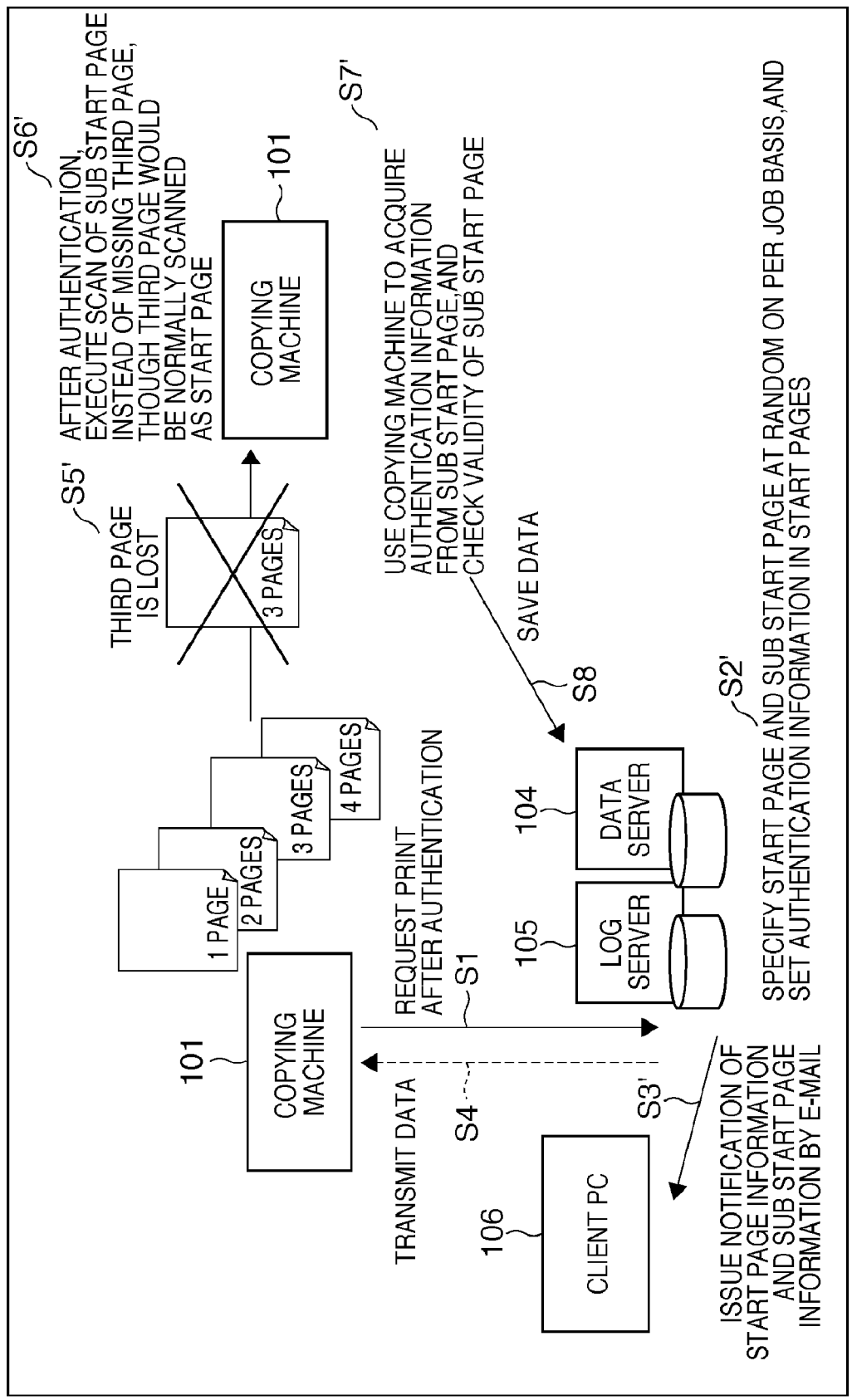
FIG. 18 depicts an overview of an example of a process according to a second embodiment.

FIG. 18 depicts an overview of a process according to the second embodiment. A difference between the first embodiment and the second embodiment is that a plurality of the start pages are specified by replacing (S2) (S3) (S5) (S6) according to the first embodiment with (S2') (S3') (S5') (S6') according to the second embodiment.

The process begins with step S1, in which the copying machine 101 executes a personal authentication process when outputting the document from the digitized workflow. As a result of the personal authentication, a list of documents under management of a user is displayed on the copying machine 101. The user selects a document to be output from the displayed list and requests a printout of the selected document. In step S2', a start page and a sub start page(s) are specified at random, on a per print request basis, from among a plurality of pages in the selected document by the data server 104 or the log server 105, and an authentication information is set in the start pages. In step S3', the start page and sub start page information including page numbers thereof is transmitted to the user's client PC 106 by e-mail.

In step S4, the data of the selected document is transmitted from the data server 104 to the copying machine 101, and output by the copying machine 101. In the present circumstance, in step S5', it is assumed that the user has lost the third page specified as the start page when performing, for example, an addition or a modification to the output document. In step S6', after the change to the output document is completed and the personal authentication by the copying machine 101 is completed, the user would normally cause the third page specified as the start page to be scanned. In the present circumstance, however, the third page specified as the start page has been lost, so one of the sub start pages other than the third page is positioned as the header page and scanned by the copying machine 101.

In step S7', the copying machine 101 acquires an authentication information from the scanned sub start page of the document, and checks a validity of the sub start page. In step S8, if a result of the check is valid, the data of the scanned document is temporarily saved in the data server 104. After the user is prompted to verify the data of the scanned document, the data and the log is registered in the data server 104 and the log server 105, respectively.

Example Table of Start Page Information According to the Second Embodiment

FIG. 19 is a table of the start page information 1900, which is created by the data server 104 or the log server 105, according to the second embodiment.

The table of the start page information 1900 stores output pages 1902 associated with a document name 1901 and a header page 1903 and a sub header page 1904 are selected from the stored output pages 1902.

The data in the table is created on a per document basis by the data server 104 or the log server 105 when executing the print request from the copying machine 101. According to the present example, a third page is automatically selected as the start page and a first page is automatically selected as the sub start page by the data server 104 and the log server 105, for the present print job of the purchase authorization document, and the start page information is registered.

Example of Start Page Setting Screen According to the Second Embodiment

FIG. 20 is a user interface for setting a start page 2000 at the client PC 106 according to the second embodiment.

By using the user interface for setting the start page 2000, whether or not to use the present function is set on a per document basis.

Checking a checkbox of "activate start page setting 2001" activates the present function to the document to be output. Clicking a button of "plural" of a "number of start pages 2002" facilitates specifying a plurality of the start pages. Checking a checkbox of "priority 2003" causes a priority setting to a page designated by a number in a frame when a plurality of the start pages are present.

Reference numerals 2004 to 2008 in FIG. 20 are similar to reference numerals 703 to 707 in FIG. 7, and, accordingly, a description thereof will be omitted herein.

It is to be understood that it would be permissible for the present invention to be applied to either a system that is configured from a plurality of devices, such as a host computer, an interface device, and a printer, as an example, as well as to an integrated apparatus or to an apparatus that is formed from a single device.

It is to be understood that an objective of the present invention is achieved by supplying a storage medium, or a recording medium, whereupon is recorded a program code of a software that implements the function of the embodiments described herein, to the system or the apparatus, and a computer, or a CPU or an MPU, of the system or the apparatus loading and executing the program code that is stored upon the storage medium.

In such a circumstance, the program code itself that is loaded from the storage medium implements the function of the embodiments described herein, and the storage medium whereupon the program code is stored configures the present invention.

The implementation of the function of the embodiments described herein is not restricted to the execution of the program code that is loaded by the computer. It is to be understood that a circumstance is also included wherein the function of the embodiments described herein is implemented by a process that is actually performed, in whole or in part, by an operating system (OS) or other software that is running upon the computer, in accordance with an instruction of the program code.

It is to be additionally understood that a circumstance is also included wherein the function of the embodiments described herein is implemented by a process as follows: the program code that is loaded from the storage medium is written to a memory that is installed upon a function extension card that is installed into the computer, or upon a function expansion unit that is connected to the computer. Thereafter, the CPU or other hardware that is installed upon the function extension card or the function expansion unit performs the actual processing, in whole or in part, in accordance with the instruction of the program code.

When applying the present invention to the storage medium, a program code that corresponds to the flowcharts described herein is stored upon the storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-165307, filed Jun. 22, 2007, which is hereby incorporated by reference herein in its entirety.

What is claimed is:

1. A computer system in which information represented by digital document is output to plural pages of print medium, and then information on the plural pages of print medium is scanned to use digital data representing the scanned information, the computer system comprising:
a selecting unit adapted to select a page of the plural pages of print medium, the selected page being other than a first page to be output of the plural pages of print medium;
an embedding unit adapted to embed authentication information in the information to be output on at least the selected page, but less than all of the plural pages of print medium;
a notification unit adapted to notify a user of a page number of the selected page embedded with the authentication information by said embedding unit, in order to inform the user regarding which of the plural pages must be scanned first to complete authentication;
a scanning unit adapted to scan information on the plural pages of print medium, the selected page being positioned by the user as a first page scanned to complete the authentication;
an authentication unit adapted to complete the authentication by authenticating digital data representing the information read scanned from the plural pages of print medium by said scanning unit based on the authentication information embedded in the selected page; and
a control unit adapted to control a process for the digital data representing the information scanned from the plural pages of print medium in accordance with a result of the authentication by said authentication unit,
wherein if the result of the authentication by said authentication unit is successful, said control unit is adapted to thereafter cause (a) the digital data representing the information scanned from the plural pages of print medium by said scanning unit to be registered along with (b) corresponding log information in one or more data storage devices.

2. The computer system according to claim 1, further comprising:
a first reception unit adapted to receive an input of a location in which said embedding unit embeds the authentication information in the selected page.

3. The computer system according to claim 1, further comprising:
a second reception unit adapted to receive an input by which said embedding unit selects an embedded form of the authentication information from a digital watermark, a bar code and a clear toner.

4. The computer system according to claim 1, wherein:
said scanning unit scans the selected page in multiple times according to a plurality of methods; and
said authentication unit authenticates the selected page based on the digital data representing information scanned in multiple times according to the plurality of methods.

5. The computer system according to claim 1, wherein:
said authentication unit allows the selected page to be scanned in a predetermined number of times, and stops the authentication of the selected page when the authentication fails after scanning the selected page in the predetermined number of times.

6. The computer system according to claim 5, further comprising:
a third reception unit adapted to, when said authentication unit stops the authentication, receive an input instructing either to terminate scanning of the digital data by said scanning unit, to send an error message to the user, or to notify an administrator of the stop of the authentication.

7. The computer system according to claim 1, wherein:
said embedding unit embeds the authentication information in a plurality of pages; and
said authentication unit authenticates using any one of the plurality of pages in which the authentication information is embedded.

8. An information processing method in a computer system in which information represented by a digital document is output to plural pages of print medium, and then information on the plural pages of print medium is scanned to use digital data representing the read information, the method comprising the steps of:
selecting a pate of the plural pages of print medium, the selected page being other than a first page to be output of the plural pages of print medium;
embedding authentication information in the information to be output on at least the selected page, but less than all of the plural pages of print medium;
notifying a user of a page number of the selected page embedded with the authentication information in said embedding step, in order to inform the user regarding which of the plural pages must be scanned first to complete authentication;
scanning information on the plural pages of print medium, the selected page being positioned by the user as a first page scanned to complete the authentication;
completing the authentication by authenticating digital data representing the information read scanned from the plural pages of print medium in said scanning step based on the authentication information embedded in the selected page; and
controlling a process for the digital data representing the information reed scanned from the plural pages of print medium in accordance with a result of the authentication in said authentication step,
wherein if the result of the authentication in said authentication step is successful, said controlling step includes thereafter causing (a) the digital data representing the information scanned from the plural pages of print medium in said scanning step to be registered along with (b) corresponding log information in one or more data storage devices.

9. An information processing apparatus comprising:
a reception unit adapted to receive the registered digital data of a document, the registered digital data including embedded authentication information in a selected page of plural pages of print medium on which the registered digital data is to be output, the selected page being other than a first page to be output of the plural pages of print medium;

an output unit adapted to output the registered digital data including the authentication information to the plural pages of print medium, the authentication information being output on at least the selected page, but less than all of the plural pages of print medium;

a scanning unit adapted to scan the plural pages of print medium and, consequently, form scanned digital data, the selected page being positioned by a user as a first page scanned to complete authentication;

an authentication unit adapted to complete the authentication by authenticating the scanned digital data based on the authentication information embedded in the selected page; and a control unit adapted to transmit the scanned digital data and a result of the authentication by said authentication unit, wherein if the result of the authentication by said authentication unit is successful, said control unit is adapted to thereafter transmit (a) the scanned digital data to one or more data storage devices for registration along with (b) corresponding log information.

10. A method of controlling an information processing apparatus comprising the steps of:

receiving registered digital data of a document, the registered digital data including embedded authentication information in a selected page of plural pages of print medium on which the registered digital data is to be output, the selected page being other than a first page to be output of the plural pages of print medium;

outputting the registered digital data including the authentication information to the plural pages of print medium, the authentication information being output on at least the selected page, but less than all of the plural pages of print medium;

scanning the plural pages of print medium and, consequently, forming scanned digital data, the selected page being positioned by a user as a first page scanned to complete authentication;

completing the authentication by authenticating the scanned digital data based on the authentication information embedded in the selected page; and controlling to transmit the scanned digital data and a result of the authentication in the authentication step, wherein if the result of the authentication in said completing the authentication step is successful, said controlling to transmit step includes thereafter transmitting (a) the scanned digital data to one or more data storage devices for registration along with (b) corresponding log information.

11. A non-transitory computer-readable storage medium storing a computer program for causing a computer to execute the method of controlling an information processing apparatus according to claim 10.

* * * * *